United States Patent [19]
Jensen et al.

[11] Patent Number: 6,022,196
[45] Date of Patent: Feb. 8, 2000

[54] SUBMERSIBLE MOTOR UNIT

[75] Inventors: Niels Due Jensen; Steen Mikkelsen, both of Bjerringbro; Preben Andersen, Hammel, all of Denmark

[73] Assignee: Grundfos A/S, Bjerringbro, Denmark

[21] Appl. No.: 09/102,783

[22] Filed: Jun. 23, 1998

[30] Foreign Application Priority Data

Jun. 26, 1997 [DE] Germany ............................ 197 27 202

[51] Int. Cl.$^7$ ..................................... F04B 49/06
[52] U.S. Cl. .................. 417/44.1; 417/423.3; 417/423.7
[58] Field of Search ........................ 417/44.1, 42, 423.3, 417/423.1, 423.7; 310/87, 91, 166, 184

[56] References Cited

U.S. PATENT DOCUMENTS

| | | | |
|---|---|---|---|
| 4,930,996 | 6/1990 | Jensen et al. ......................... | 417/423.3 |
| 4,930,997 | 6/1990 | Bennett ................................ | 417/410.1 |
| 5,025,185 | 6/1991 | Reinoehl .................................. | 310/87 |
| 5,028,212 | 7/1991 | Brophey et al. ......................... | 417/423 |
| 5,028,218 | 7/1991 | Jensen et al. . | |
| 5,100,298 | 3/1992 | Shibata et al. ................... | 417/423.7 X |
| 5,493,765 | 2/1996 | Klebl et al. .......................... | 29/407.08 |
| 5,763,973 | 6/1998 | Cramer ..................................... | 310/103 |
| 5,941,695 | 8/1999 | Jensen et al. ........................ | 417/423.3 |

FOREIGN PATENT DOCUMENTS 3642727  6/1988  Germany .

*Primary Examiner*—Stephen Gravini
*Attorney, Agent, or Firm*—Jacox, Meckstroth & Jenkins

[57] ABSTRACT

A submersible motor unit comprises an electrical drive motor, an electrical control means for setting the rotary speed and/or the torque of the motor, a common heat-conducting housing for the motor and the control means as well as a connection cable electrically connected to the control means wherein this means is provided on the end side of the motor distant to the pump. In particular for an improved disposal, repair and cooling of the submersible motor unit the electrical control means is formed as a cartridge-like constructional unit which can be inserted into the common housing and which can be electrically plug connected to the drive motor, and the housing of the control means connected to the unshielded connection cable bears with its outer circumferential surface on the inner circumferential surface of the common housing.

12 Claims, 3 Drawing Sheets

SUBMERSIBLE MOTOR UNIT

BACKGROUND OF THE INVENTION

The invention proceeds from a submersible motor unit for a centrifugal pump.

A typical pump of the past is described in DE-C-38 20 003. It comprises a common housing which consists of a one-piece tubular jacket part with a floor part fastened thereto, of an electrical drive motor for the centrifugal pump and of an electrical control means for setting the rotary speed and/or the torque of the drive motor wherein the drive motor and the control means are arranged behind one another in the common housing. An insulated connection cable which is introduced on the end of the motor on the pump side and runs within the common housing supplies the control means with electrical energy. The electrical control means consists of a power component which produces considerable heat and which is fastened to an intermediately connected transverse wall in the common housing in order to be cooled by the cooling flow in the rotor space of the drive motor, and of an electrical element spacially separated from the power component, e.g. a capacitor which is fastened to the floor part of the common housing and may be surrounded by a pressure resistant mass.

In DE-C-36 42 727 there is described a further submersible motor unit. This unit comprises an assembled housing which consists of a first tubular jacket part in which there is located the electrical drive motor for the centrifugal pump and of a second jacket part unreleasably fastened thereto, with an end floor, in which there is located the electrical control means for the drive motor. The electrical control means, e.g. a frequency converter is electrically connected to the drive motor via a plug connection design in order to control the drive motor. The current supply of the electrical control means is effected by the drive motor. The control means whose possible spacial arrangement is shown in FIG. 1 of this document contains in its housing the usual electronics which is encapsulated in a pressure tight manner in this housing by way of rigid materials.

A considerable disadvantage of these prior known submersible motor units lies in the fact that a disposal of non-usable submersible motor units or parts thereof, with due respect to the materials, may not be carried out in an economical manner. A large expense with respect to labor and time is required for this since the disaggregation of the units is very complicated and thus causes high costs. To a relatively limited extent there is only a rough disaggregation which must be carried out with numerous separating tools, but also often no disaggregation of the units takes place. The occuring coarse parts or complete units are instead reduced in size to the required degree in a shredder installation. The reduced mass is only partly reused and the rest are laid aside in a dump. Here environmental damage may occur since the electronic components and the solid matter surrounding these and casting masses contain components which with the earth or other matter may cause environmentally damaging compounds.

On account of the cost, legal rules for the environmentally friendly disposal are often ignored.

The described state of the art further from the point of view of preventing environmentally damaging refuse only permits an economical repair of the submersible motor units in a limited manner. Often for a repair of the inner parts of the units the common housing for the motor and the control means must be damaged to a great extent and mostly damaged beyond repair so that there arises additional costs on account of a new common housing. Apart from this also the control means for the motor essentially cannot be repaired economically since its electronic components for reasons of stability, for the housing of its own, which itself must be unrepairably damaged, are surrounded by solid matter and/or casting masses.

Furthermore the cooling of the electrical control means for the motor is also not satisfactory since the heat occuring from the electrical control means and in particular from its components strongly producing heat may only be removed at a high excess temperature.

BRIEF SUMMARY OF THE INVENTION

The object of the invention lies in the improvement of a submersible motor unit of the previously cited type such that the unit from the point of view of preventing environmental damage can be economically disposed of and repaired, and is improved with respect to its cooling and shape stability.

In one aspect, the invention comprises a submersible motor unit for a centrifugal pump, comprising an electrical drive motor, an electrical control mean for setting the rotary speed and/or the torque of the motor, a common heat-conducting housing for the motor and the control means as well as a connection cable electrically connected to the control means wherein this means is provided in the end side of the motor distant to the pump, wherein the electrical control means is formed as a cartridge-like constructional unit which can be inserted into the common housing and which can be electrically plug connected to the drive motor, wherein the housing of the control means bears with its outer circumferential surface on the inner circumferential surface of the common housing and wherein the electrical control means at its end distant to the motor is electrically connected to an unshielded connection cable.

By way of the solution according to the invention the submersible motor unit may be economically disposed of and repaired since the module units such as in particular the drive motor and the electrical control means may be disassembled quickly with the minimum of labor effort and for its part may be disaggregated in a simple manner according to types of material and where appropriate after exchanging damaged components, module units or other parts can be just as well assembled again in a time-saving and cost-saving manner. In this manner an improved ability to repair the submersible motor unit is ensured and with respect to the disposal only those parts which have irreparable damage need to be disposed of. There exists the possibility of providing an improved separation of material of damaged parts or modules so that from the exchanged materials old raw material may be recovered by which means primary raw material may be saved and the pollution of the dump and environment may be avoided or reduced to a minimum. In the case of a damaged electrical connection cable a time-consuming disassembly and assembly of the cable concerned is done away with since it is connected in a simple manner to the cartridge-like constructional unit. Furthermore the cooling of the electrical control means of the submersible motor unit according to the invention is improved since its dissipated heat is then led away from its housing directly to the common housing and from here to the fluid which is to be delivered and which surrounds the unit. Finally on account of the fact that the housing of the electrical control means directly bears on the common housing also the stability of the submersible motor unit in the region of the electrical control means is improved without the common housing in the section of the electrical control means having to be designed in a particularly stable manner. In particular the submersible motor unit is by way of this more resistant to bending and the common housing may continuously consist of a single tubular body with a relatively thin wall thickness for the module units of the drive motor and the electrical control means. Furthermore the shape-stable cartridge-like constructional unit permits a secure transport of the sensitive electronic components contained in it during manufacture of the submersible motor unit.

In one advantageous formation of the submersible motor unit according to the invention this comprises an end plug unit which is already provided with the connection cable. This permits a very rapid changing of a defect connection cable.

In a further advantageous formation of the submersible motor unit according to the invention the housing of the electrical control means comprises a tubular heat conducting middle unit for accommodating the usual electrical control circuit means and two end units releasably connected thereto in each case with an axial electrical plug formation, wherein the plug formations of both end units engage into complementary electrical plug formations of the motor and of the end plug unit. Such a control means can be quickly connected to or removed from bordering module units and moreover the control circuit means provided within the housing of the control means are rapidly accessible for the purpose of exchanging and/or disposal. After the exchange of damaged components the housing itself can be put together again.

In a further design the middle unit, forming a housing circumferential wall of the electrical control means, comprises at least one releasably fastened shell part which is semicircular in cross section, extends over the whole length of the middle unit and is formed radially elastic. The radially elastic design of the shell part may for example be achieved via radially running beads. In this manner a radially outwardly acting bearing force of the housing of the control means on the common housing is achieved when the electrical control means in the form of the cartridge-like constructional unit is inserted into the common housing. By way of this on manufacture large tolerances may be selected and in spite of this it is ensured that the housing of the control means bears on the common housing since the somewhat pressed together housing of the control means after insertion into the common housing presses radially outwards. Thus in a simple manner it is ensured that the heat transport from the housing of the control means to the common housing takes place optimally.

In an advantageous further formation of the middle unit this comprises a dismountable circuit board extending in its longitudinal centre, which is provided with the usual electrical circuit means and further there are provided heat dissipation means in order to carry of the dissipated heat from the electronic parts of the circuit board. The heat dissipation means may consist of elastically deformable cushions which are clamped in between the electronics and the housing of the middle unit. The heat dissipation means may also consist of a metal block whose outer region partly co-forms the housing of the electrical control means. Thus the heat dissipating means may be economically applied since it only needs to be provided where heat needs to be led away. Casting masses and solid matter capable of disposal, for filling out the cavities of the cartridge-like constructional unit are no longer necessary.

BRIEF DESCRIPTION OF THE DRAWINGS

The invention is hereinafter described in more detail by way of one embodiment example illustrated in the attached drawings. There are shown.

DETAILED DESCRIPTION OF THE INVENTION

Figure 1:
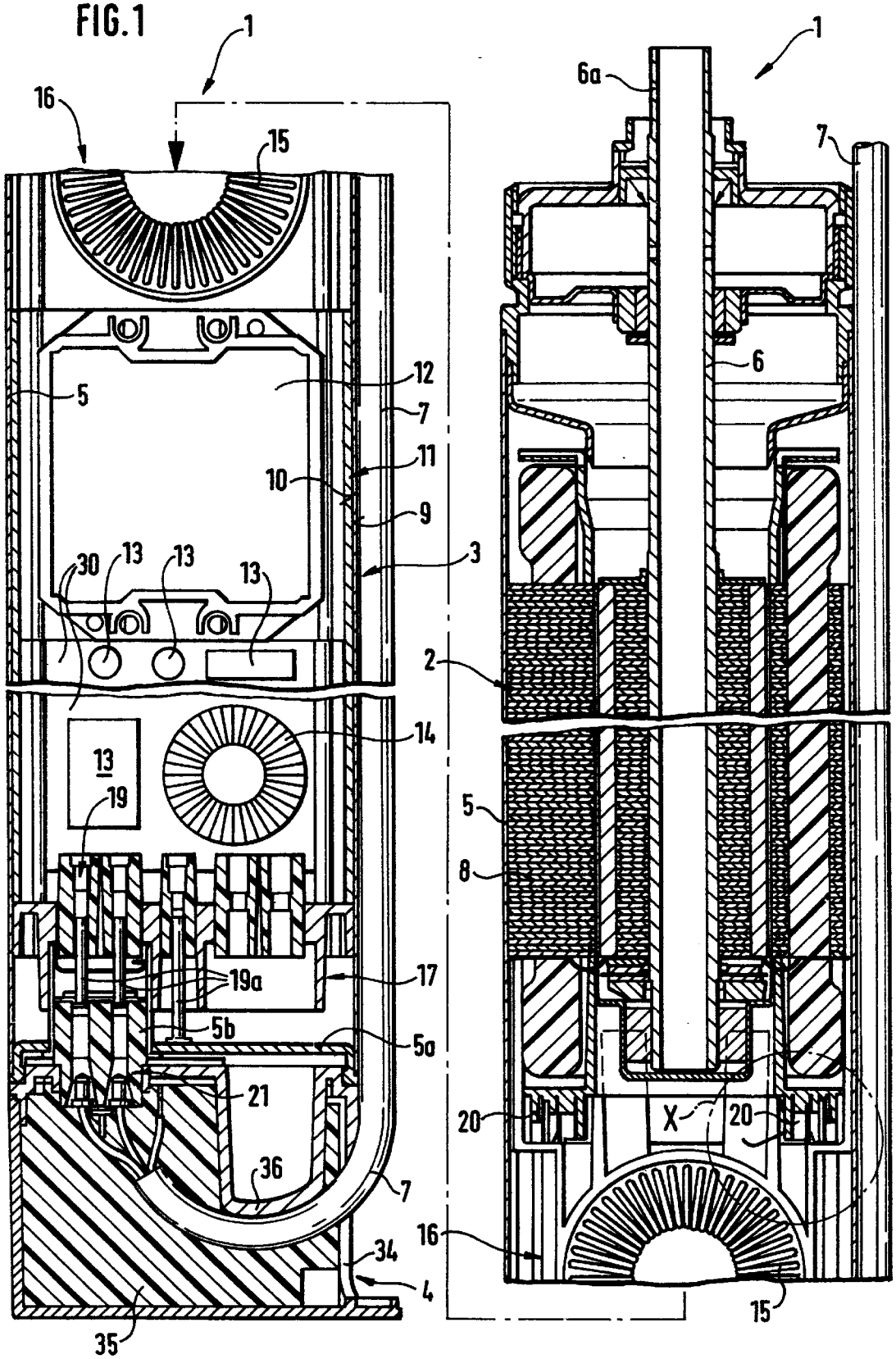
FIG. 1 an axial longitudinal section through the embodiment example.

The submersible motor unit indicated in FIG. 1 generally at 1 comprises in each case in module units, an electrical drive motor 2, an electrical control means 3 for setting the rotary speed and/or the torque of the motor 2 and an electrical end plug unit 4, wherein the motor and the control means are accommodated in a common tubular and heat-conducting housing 5. The drive motor with its shaft 6 drives a centrifugal pump (not shown) which is coupled with the protruding end 6a of the shaft 6 in the known manner. The end plug unit 4 is rigidly connected electrically to an unshielded connection cable 7 which runs on the outer side of the common housing 5 and where appropriate is releasably fastened thereto with suitable means. Instead of to the unit 4 the cable 7 may also be directly electrically connected to the means 3.

The drive motor 2 is for example a wet-running motor in the form of a canned motor so that the rotor of the motor may be cooled by a fluid in the known manner. The stator 8 of the motor 2 is in contrast not directly flowed upon by the motor fluid but bears with the outer circumference of its armature on the common housing 5 and thus in the usual manner is cooled by the outer fluid in which the submersible motor unit is submersed. Furthermore the drive motor 2 may be an alternating-current motor, wherein then the control means 3 is a so-called frequency converter. On the other hand the motor 2 may also be an electronically commutated direct-current motor, wherein then the control means 3 is provided with the suitable electronic equipment which is known per se in order to control the motor with regard to its rotary speed and/or its torque. Such a motor is shown in the embodiment example according to FIG. 1.

Figure 4:
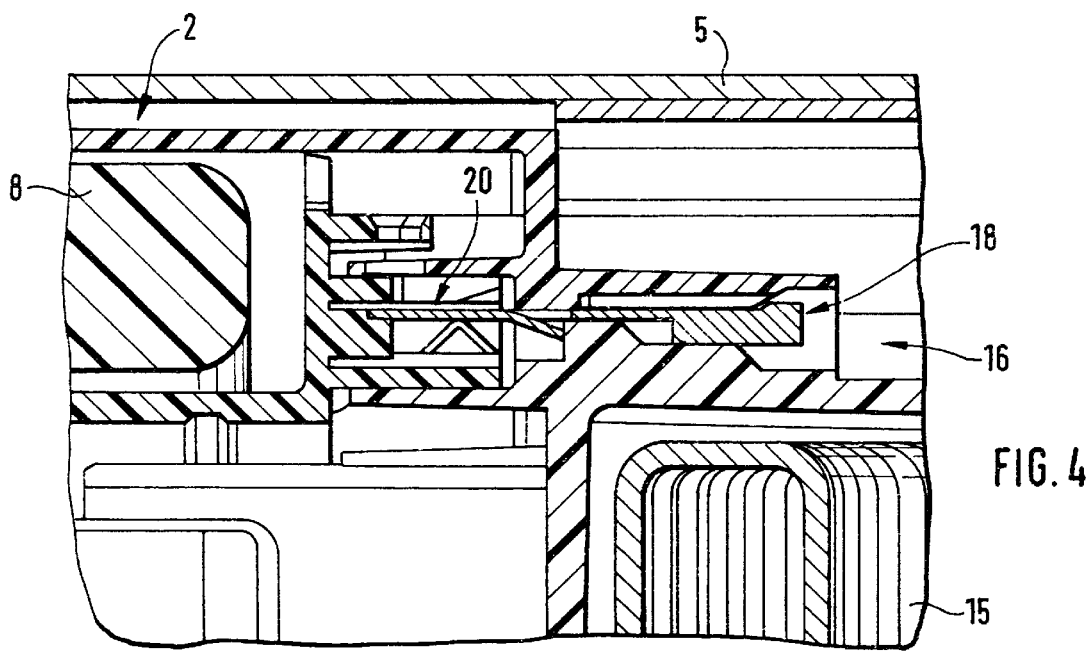

The control unit 3 used for this motor is formed as a cartridge-like constructional unit which at its one end is electrically connected in a plug manner to the drive motor, as can be best recognized from FIG. 4 and at its other end to the end plug unit 4. The cartridge-like constructional unit comprises an outer diameter which corresponds to the inner diameter of the common housing 5. After its axial insertion into the common housing the cartridge-like constructional unit with its outer circumferential surface 9 comes to bear on the inner cirumferential surface 10 of the common housing 5 so that the constructional unit can directly lead away the dissipated heat produced in it to the common housing.

According to the embodiment example shown the housing of the electrical control means 3 consists of a tubular heat-conducting multi-part middle unit 11 which in its inside comprises the usual electrical and/or electronic control circuit means 12–15, and of two end units 16 and 17 releasably connected to the middle unit 11 in each case with an axial electrical plug formation 18 and 19 respectively. In order to provide the electrical contact of the control means 3 to the drive motor 2 and to the end plug unit 4 on the side of the means 3 distant to the motor, the motor 2 as well as the end plug unit 4 comprise a plug formation 20 and 21 respectively which in each case are formed complemetary to the corresponding plug formations 18 and 19 respectively, of the means 3.

In detail the middle unit 11 consists of several parts 22, 23, 24 and 25 which are formed largely as shell parts and have a semicircular cross section. As can be seen from FIG. 2 the shell part 22 extends over the whole length of the middle unit 11 whilst the other half of the middle unit 11 consists of the two shell parts 23 and 24 as well as of at least one metal block 25 which apart from it function as a housing wall also has another function which will become clear. The housing parts 22 to 25 are releasably connected to one another via latching means 26,27 in the form or a groove and a cheek engaging therein. Likewise the end plug units 16 and 17 with the middle unit are releasably connected to one another, for example via rib parts 28 which are connected to the shell parts 22, 23 and 24 with a friction fit, or likewise via latching means or other connection types as is clear to the man skilled in the art without further ado.

The middle unit 11 is furthermore formed somewhat elastically in the radial direction so that the control means 3 mounted to a cartridge-like constructional unit is radially flexible and can be somewhat pressed together radially inwards. Since the outer diameter of the middle unit is slightly larger than the inner diameter of the common housing 5 before the insertion of the constructional unit into the common housing, it is ensured that after the insertion of the constructional unit the outer circumferential surface of the common housing bears with a certain pressure on the inner circumferential surface of the common housing in order to guarantee an optimum heat transfer.

Figure 2:
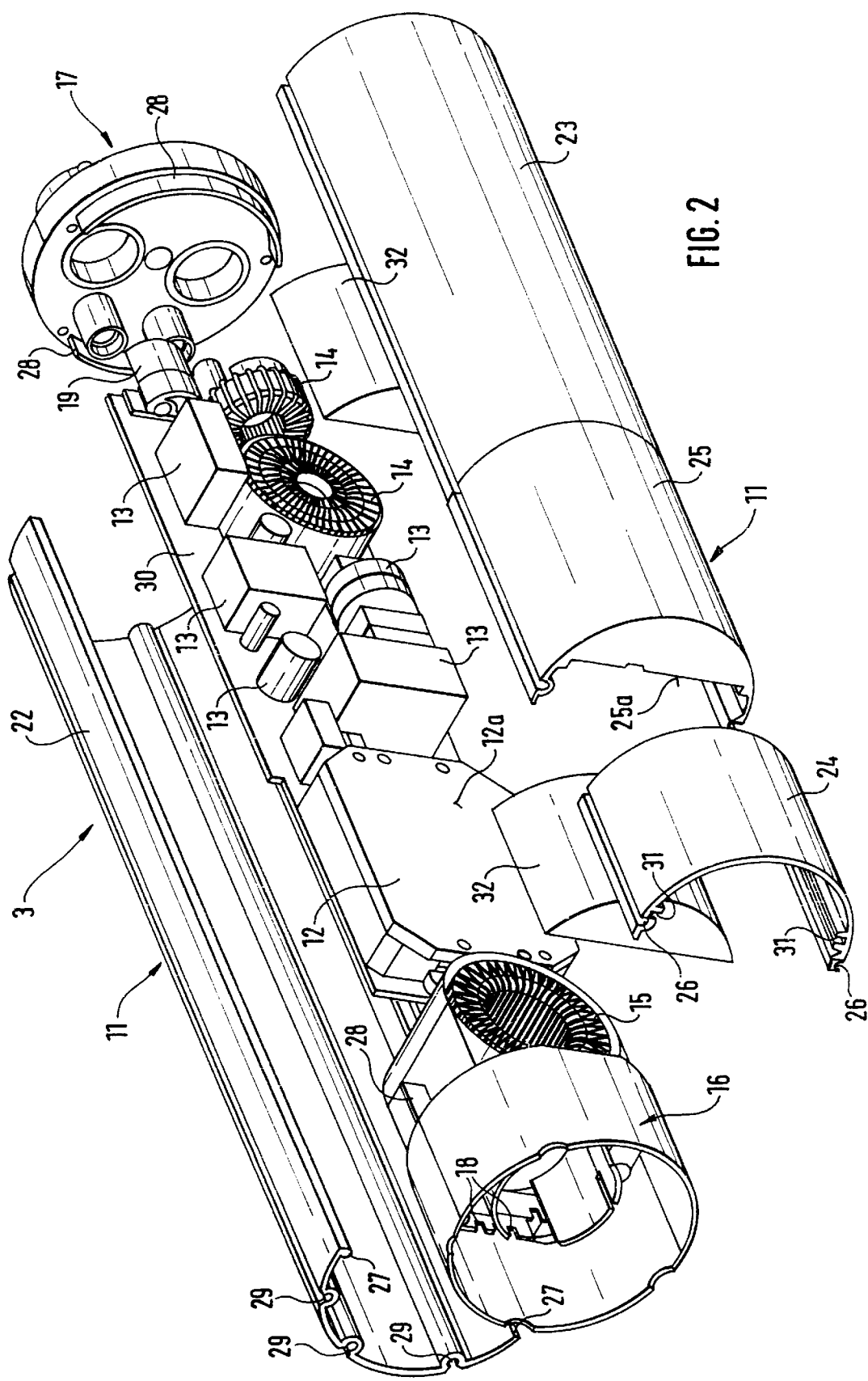
FIG. 2 an exploded perspective view of a module unit of the embodiment example according to FIG. 1, FIG. 3 a longitudinal section through a further module unit of the embodiment example according to FIG. 1, FIG. 4 a part representation at X in FIG. 1 in an enlarged scale.
Figure 3:
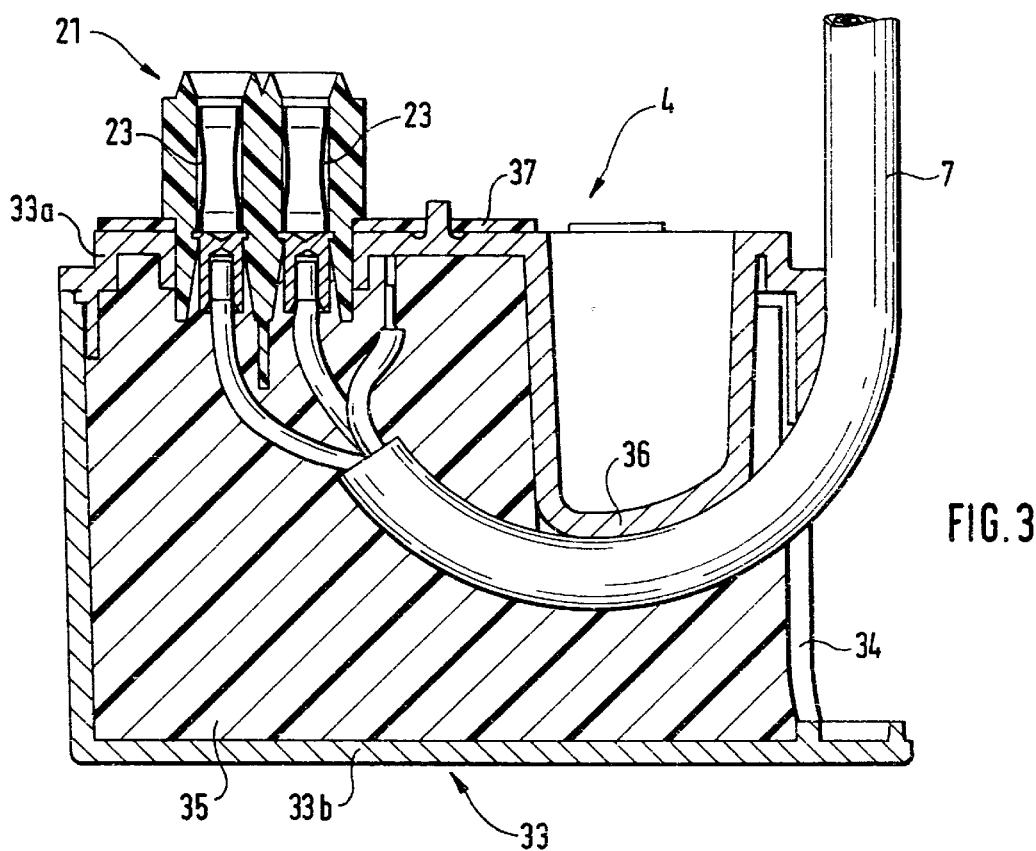

In order to achieve this radial elasticity it may be proceeded such that the shell part 22 comprises on its circumference several beads 29 which extend over the length of the shell part 22 as is shown below in FIG. 2.

The parts 22 to 25 consist of heat-conducting material for example of aluminium.

The middle unit further comprises a dismountable circuit board 30 which extends in its longitudinal centre and which is essentially provided with the usual electrical and/or electronic circuit and control means 12 to 15. In order to hold the circuit board 30 in the middle unit 11 in a defined manner for example the parts 23, 24 and 25 may be provided with two diametrically opposite grooves 31 into which the equipped circuit board is inserted. In this manner the whole circuit board can be quickly replaced.

In order to be able to lead away the dissipated heat from the circuit and control means 12 to 15 in a quick and directed manner, in the inside of the middle unit 11 or the cartridge-like constructional unit there are e.g provided exchangable heat dissipating means. These may for instance consist of elastic cushions 32 in a segment form which on the one side lie on the heat producing electronics of the circuit board or other heat producing parts and on the other side bear on the inner circumferential surface of the parts 23 and 24 in a manner such that the cushions are clamped in. For the secure positioning of the elastic cushions on the inside these may be adhesed to the middle unit.

The heat dissipating means may also however comprise at least metal block whose outer region partly co-forms the housing of the middle unit 11. For example the already mentioned component 25 may co-assume this function as is deduced from FIG. 2. The electronic component 12 of the circuit board produces very much dissipated heat and thus with its complete upper surface 12a bears on the inner surface 25a of the one-piece or multi-piece metal block 25 so that the captured dissipated heat is directly given off from the block 25 to the common housing 5.

The position, distanced in front of one another, of the heat dissipating means 25 and 32 in particular that of the metal block 25 arranged roughly in the middle region of the middle unit 11 protects the drive motor 2 in a particularly effective manner from the dissipated heat of the electrical and electronic components 12–15 and from the heat effects of mud into which the submersible motor unit may be immersed with its lower region during its operation.

The end plug unit 4 comprises a housing 33 of a floor part 33a and a lid part 33b. The floor part is provided with a plug formation 21 whose electrically conducting sockets are connected to the leads of the electrical outer cable 7. The housing 33 further comprises a lateral entrance 34 for the outer cable. The housing further is filled with a casting mass 35 in order to fix the cable 7 in the housing without bends and to seal it in a fluid-tight manner to the outside.

In order to ensure the mounting of the connection cable 7 without bends, in particular during the filling of the housing 33 with the casting mass 35, the floor part 33a comprises a support 36 which also ensures a desired deflecting radius of the cable 7 entering into the housing 33.

An advantageous embodiment form of the unshielded connection cable 7 of the end plug unit 4 lies in designing this cable flat so that it only slightly enlarges the outer diameter of the submersible motor unit.

As FIG. 1 shows the common housing 5 at its end distant to the motor is connected to a floor wall 5a in a fluid-tight manner and this floor wall comprises a sleeve 5b into which protrude the plug pins of the plug formation 19 of the electronic control means 3. The end plug unit 4 is introduced with its end plug formation 21 into the sleeve 5b and thus creates the electrical contact of the plug formation 19 of the means 3. In order to obtain also in the region of the plug formation 21 with an inserted unit 4 a good sealing with respect to the outer fluid in which the submersible motor unit is immersed, the floor part 33a of the unit 4 is provided with a sealing means 37, for example in the form of an elastic plate.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A submersible motor unit for a centrifugal pump, comprising an electrical drive motor, an electrical control means for setting the rotary speed and/or the torque of the motor, a common heat-conducting housing for the motor and the control means as well as a connection cable electrically connected to the control means wherein this means is provided on the end side of the motor distant to the pump, wherein the electrical control means is formed as a cartridge-like constructional unit which can be inserted into the common housing and which can be electrically plug connected to the drive motor, wherein the housing of the control means bears with its outer circumferential surface on the inner circumferential surface of the common housing and wherein the electrical control means at its end distant to the motor is electrically connected to an unshielded connection cable.

2. A submersible motor unit according to claim 1, wherein the unshielded connection cable is connected to the end plug unit which for its part is plug connected to the control means.

3. A submersible motor unit according to claim 1, wherein the housing of the electrical control means comprises a tubular, heat-conducting material middle unit for receiving the usual electrical and/or electronic control means and two end units releasably connected thereto with in each case an axial electrical plug formation, and wherein the plug formations of both end units engage into complementary electrical plug formations of the motor and of the end plug unit.

4. A submersible motor unit according to claim 1, wherein the middle unit forming a housing circumferential wall of the electrical control means comprises at least one releasably fastened shell part which extends over the complete length of the middle unit and is formed radially elastically in order to achieve a radially outwardly acting bearing pressure of the middle unit on the common housing with a cartridge-like contructional unit inserted therein.

5. A submersible motor unit according to claim 4, wherein the radial elastic formation of the shell part consists of beads extending over the length of the shell part.

6. A submersible motor unit according to claim 3, wherein the middle unit comprises a dismountable circuit board extending in its longitudinal centre, which is provided with the usual electrical and/or electronic control circuit means. and wherein exchangeable heat dissipating means are provided in order to carry off the dissipated heat from the heat producing parts of the circuit board to the middle unit.

7. A submersible motor unit according to claim 6, wherein the heat dissipating means consist of elastic cushions which lie on the heat producing parts of the circuit board and which are clamped between these parts and the middle unit.

8. A submersible motor unit according to claim 7, wherein the cushion is adhesed to the middle unit of the control means.

9. A submersible motor according to claim 6, wherein the heat dissipating means comprise at least one metal block whose outer region section partly co-forms the housing of the middle unit.

10. A submersible motor unit according to one of claim 2, wherein the end plug unit comprises a housing with a lateral entrance for the connection cable and with a casting mass in its inside for the bend-free positioning of the cable therein and for the fluid-tight sealing of the cable in the end plug unit.

11. A submersible motor unit according to claim 10, wherein in the inside of the housing of the end plug unit there is provided a support for the bend-free deflection of the connection cable.

12. A submersible motor unit according to one of the claim 2 wherein the electrical connection cable is a flat cable.

* * * * *